(12) United States Patent
Gruenwald et al.

(10) Patent No.: US 6,214,272 B1
(45) Date of Patent: *Apr. 10, 2001

(54) ROTATIONAL MOLDING PROCESS

(75) Inventors: Dave Gruenwald, Oshkosh, WI (US); Stephen Crane, Stanwood, WA (US)

(73) Assignee: Brunswick Corporation, Lake Forest, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,132

(22) Filed: Jul. 14, 1998

(51) Int. Cl.[7] .......................... B29C 41/04; B29C 41/08; B29C 41/22; B29C 35/02
(52) U.S. Cl. ....................... 264/255; 264/308; 264/309; 264/310
(58) Field of Search ....................... 264/255, 250, 264/254, 260, 303, 305, 309, 310, 311, 308, DIG. 57, DIG. 72, 114

(56) References Cited

U.S. PATENT DOCUMENTS

| | | | |
|---|---|---|---|
| 3,683,062 | * 8/1972 | Von Der Heide | 264/310 |
| 3,875,275 | * 4/1975 | Lemelson | 264/45.3 |
| 3,984,511 | 10/1976 | Lammers | 264/45.4 |
| 3,989,787 | * 11/1976 | Scott, Jr. et al. | 264/114 |
| 4,238,537 | * 12/1980 | Kerr | 264/310 |
| 4,687,531 | * 8/1987 | Potoczky | 264/309 |
| 5,073,325 | * 12/1991 | Gray | 264/245 |
| 5,324,472 | * 6/1994 | Page et al. | 264/311 |
| 5,662,996 | * 9/1997 | Jourquin et al. | 264/255 |

FOREIGN PATENT DOCUMENTS

| | | |
|---|---|---|
| 4202354 A1 | 8/1993 | (DE) . |
| 4221679 A1 | 1/1994 | (DE) . |
| 196 26 272 | 1/1998 | (DE) . |
| 2 050 921 | 1/1981 | (GB) . |
| 2 267 675 | 12/1993 | (GB) . |
| WO 96/30180 | 10/1996 | (WO) . |

OTHER PUBLICATIONS

Database WPI, Section Ch. Week 198623, Jun. 1986 (Jun. 1986)—NIppon Petrochemicals Co. Ltd, Apr. 28, 1986 abstract.
International Search Report—PCT/us99/15889.

* cited by examiner

*Primary Examiner*—Angela Ortiz
(74) *Attorney, Agent, or Firm*—Pillsbury Madison & Sutro LLP

(57) ABSTRACT

A rotational molding method is provided consisting in a first method of spraying the inner mold area with an acrylic polyethylene alloy prior to loading the resin into the mold. The mold is then heated, rotated and cooled to form the molded part. The part is provided with a shinier and harder surface layer as compared to previous rotational molding methods. In a second method, in lieu of spraying, the acrylic polyethylene alloy is loaded into the mold with the resin. In the third and fourth methods, a drop box is provided for releasing resins into the mold. Other materials, in addition to acrylic polyethylene, can also be used with the various methods.

15 Claims, 2 Drawing Sheets

ROTATIONAL MOLDING PROCESS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to rotational molding methods and particularly to a rotational molding which create a shiny and hard surface layer for a molded part.

2. Description of Related Art

Rotational molding, which is often referred to as "rotomolding", is a process where a powdered thermoplastic is poured into a mold and the mold is suspended in an oven. The material utilized for the powdered thermoplastic is often polyethylene, while the mold is ordinarily constructed from metal. Once suspended in the oven, the metal mold is heated beyond the melting point of the powder and rotated to evenly coat the inner surface of the mold with the melted plastic. Once properly heated, the mold is then cooled and the part is demolded.

The mold serves two purposes: (1) to transfer heat to the resin to establish the shape to be formed and (2) to provide a cavity in which to cool the material. Typically, a pre-measured resin is loaded into the mold and the mold is disposed within an oven and rotated on both its vertical and horizontal axis. As the resin melts it sticks to the inner surface of the mold, coating such surface evenly. Usually, the rotation of the mold continues during the cooling cycle to allow the intended part to maintain an even wall thickness. Once the part is cooled, it is removed from the mold.

Rotomolding has been utilized, amongst other items, for the manufacture of boats. Some advantages to rotomolding, as compared to other molding techniques is the relatively low cost for molds, ease in adaptation for short production runs, the elimination of secondary tooling and the minimal amount of scrap which is produced from the process. Rotomolding also provides for consistent wall thickness and sharp outside corners which are essentially stress free.

Rotomolding has also been traditionally limited to use with a single material. Thus, one specific problem with rotomolded products is that the surface of the product is soft.

When creating a structure comprise of at least two different materials, bonding of the materials is typically an issue, particularly with materials having disparate properties. In the past, rotomolding processes have not been used for marrying materials having separate properties.

It is therefore to the effective resolution of the aforementioned problem that the present invention is directed.

BRIEF SUMMARY OF THE INVENTION

The present invention discloses a process for creating an improved rotomolded products. In a first method the inner mold area is sprayed with a material, such as an acrylic polyethylene alloy, prior to loading the resin into the mold. Once the resin is loaded, the mold is then heated, rotated and cooled to form the molded part. Once cooled the part is then removed from the mold.

In a second method, in lieu of spraying, the acrylic polyethylene alloy is loaded into the mold with the resin. Once loaded, the mold is then heated, rotated and cooled. Once cooled the part is then removed from the mold.

In a third method, a mold is opened and a first resin which is to become the outer surface of the part is added. Once the first resin is added the mold is closed, heated and rotated. Once first resin is sufficiently melted, a "drop" box is opened within the mold to introduce a second resin into the mold. The second resin will become the body or structure of the molded part. After the second resin is introduced by the drop box, the mold is again heated and rotated as described above. As heating begins, the second resin material begins to melt and sticks to the inner surface of the mold over the first resin. Thus, when the mold is cooled, the first resin will form the surface layer of the part. Once cooled the mold is opened and the part is removed.

In a fourth method, a mold is opened and a first resin which is to become the outer surface of the part is added. In this embodiment, the first resin is not an alloy but rather preferably consist of a separate material such as acrylic, polycarbonate, styrenic or other hardened plastic which will create a hardened outer shell. Once the first resin is added the mold is closed, heated and rotated. The mold is heated to a temperature which causes the first resin to melt.

Once the first resin is sufficiently melted, a first drop box is opened within the mold to introduce a second resin which acts as a tie coat or bond layer. The tie coat bonds to the first resin. After the second tie coat resin is released into the mold, the mold is heated and rotated to evenly bond to the first resin which is provided over the inner surface of the mold.

Once the tie coat is properly melted, a second drop box is opened within the mold and a third resin is released. The third resin will become the body or structure of the molded part. After the third resin is released into the mold, the mold is once again heated and rotated, allowing the third resin to become melted and evenly distributed over the inside of the mold. This third resin bonds to the tie coat layer. The previously released tie coat acts as a bridge or intermediary allowing the main body resin to bond to the first layer, thereby bonding two materials which might not normally bond. Thus, when the mold is cooled, the first resin will form the surface layer of the part, the second layer the tie coat and the third layer the main body or substrate of the part. Once cooled the mold is opened and the part is removed.

With all of the methods, a rotomolded product can be constructed having an outer surface with different characteristics and properties as compared to its inner surface or substrate. The methods provided for stronger bonds between the materials as compared to conventional methods, such as lamination. Thus, in one embodiment the molded part can be provided with a shinier and harder surface layer as compared to previous rotational molding methods. Alternatively, the present invention allows for a softer surface layer with a harder substrate layer.

Accordingly, it is an object of the present invention to provide a rotational molding process which yields a harder outer surface of a molded part as compared to conventional rotational molding processes.

It is another object of the present invention to provide a rotational molding process which yields a stronger bond between the surface layer and the substrate of a molded part as compared to conventional rotational molding processes.

In accordance with these and other objects which will become apparent hereinafter, the instant invention will now be described with particular reference to the accompanying drawings.

BRIEF DESCRIPTION OF THE SEVERAL VIEWS OF THE DRAWINGS

The invention may be better understood by reference to the drawings in which.

DETAILED DESCRIPTION OF THE INVENTION

Figure 1:
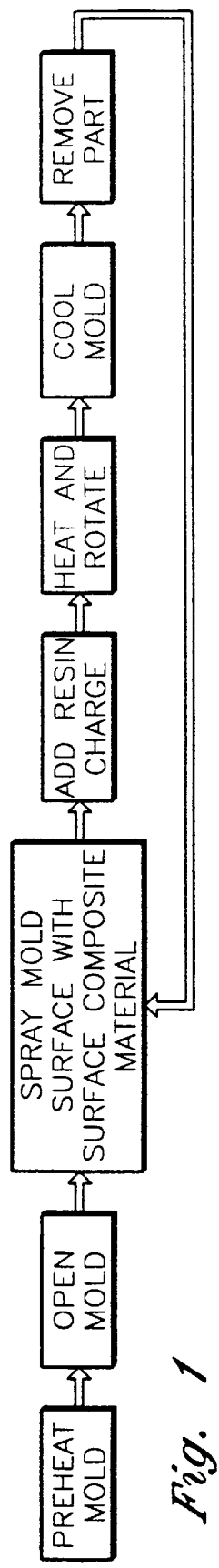
FIG. 1 is a block diagram of a first method for the rotational molding process of the present invention.

As seen in FIG. 1 a first method is illustrated for the rotational molding process of the present invention. In the first method a mold is provided which is shaped to correspond to the shape of the intended part. Preferably, a metal mold is utilized, however such is not limiting. After the mold is opened, an inner area of the mold can be sprayed with an alloy consisting of acrylic and polyethylene in the preferred embodiment. However, it should be understood that the invention is not limited to the specific acrylic polyethylene alloy for the outer surface. Thus, other materials or alloys that will provide for a relatively hard outer surface can be substituted for the acrylic polyethylene alloy and are considered within the scope of the invention.

Preferably, a conventional aerosol is utilized to spray the acrylic polyethylene alloy. As the alloy is preferably in a powder form, a conventional solvent material, such as alcohol, can be provided to act as carrier of the alloy from the aerosol sprayer to the mold. The alcohol eventually evaporates off, after transporting the alloy, once the mold is heated.

The mold is preferably preheated prior to spraying the acrylic polyethylene alloy. Where preheated, upon being sprayed by the aerosol sprayer, the acrylic polyethylene alloy melts and sticks to the inner surface of the mold and ultimately will become the outer surface of the molded part. Having an outer surface consisting of the acrylic polyethylene alloy provides the molded part with a relatively harder appearance as compared to conventional rotational methods. The acrylic polyethylene alloy also provides a harder outer surface, less likely to crack.

After spraying, the mold is loaded with a resin charge Though the present invention is intended to be used with various materials used for the resin, the preferred material for the resin is at least one form of polyethylene. However, other materials for the resin are considered within the scope of the invention. The resin can consist of polyethylene and can include two sizes of polyethylene to create a "sandwich" type structure having solid skins and a foamed polyethylene core. Preferably, the resin is also provided in powder form.

Once the resin is loaded into the mold, the mold is preferably disposed within a conventional rotomolding oven where it is heated and rotated. Any conventional method can be used for the heating and rotating of the mold. Thus, the mold can be suspended or disposed within an oven and rotated on both its vertical and horizontal axis. The mold is heated to a temperature beyond the melting point of the resin which causes the resin to melt and stick to the inner surface of the mold which is already coated with the acrylic polyethylene alloy.

Rotating the mold allows for an even coat of the inner surface of the mold with the resin and the acrylic polyethylene alloy. Where polyethylene is used as the resin, preferably the mold is heated to a temperature ranging between 3500 to 5000, however such range should not be considered limiting.

Once sufficiently melted, the resin and acrylic polyethylene alloy form the shape of the intended part, with the composite acting as a thin surface layer and bonding alloy, and the resin forming the substrate of the part. The shape of the part corresponds to the shape of the mold.

After the mold has been sufficiently heated and rotated, the mold remains closed and is allowed to cool. While cooling the mold can continue to be rotated to allow the part inside the mold to maintain an even wall thickness. Once properly cooled, the mold is opened or separated and the molded part is removed.

Figure 2:
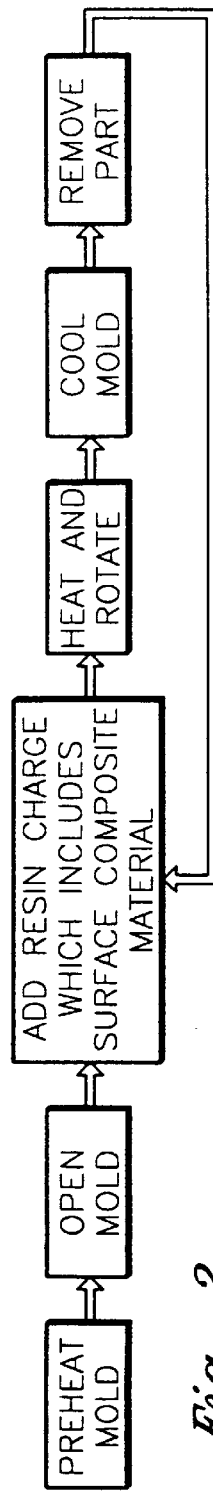
FIG. 2 is a block diagram of a second method for the rotational molding process of the present invention.

FIG. 2 illustrates the second method for the rotational molding process of the present invention. In this method, a mold, similar to the mold described above is provided. However, the acrylic polyethylene alloy is not sprayed prior to loading the resin. Rather, the acrylic polyethylene alloy is preferably provided in powder form and loaded into the mold at the same time the resin is loaded. The resin is also preferably provided in powder form and can consist of one or more polyethylene materials. When loading, the alloy powder and the resin powder can be mixed together.

The particles consisting of the alloy powder are preferably smaller in size as compared to the particles constituting the resin powder. When the alloy and resin are loaded the forces of gravity will caused the smaller size particles to move outward within the mold. The smaller size alloy particles will also melt quicker than the larger size resin particles. Thus, the force of gravity and quicker melting characteristics assure that the particles constituting the acrylic polyethylene alloy form the outer surface layer of the molded part.

As with the first method, other materials can be used for the outer surface and/or resin and are considered within the scope of the invention.

Where a powder is used for the resin, the alloy material can be cryogenically ground to ensure that the size of the alloy material is smaller than the size of the resin material.

The mold is heated and rotated as described above. As heating begins, the smaller alloy material will melt first, as compared to the resin material. By melting first, the alloy material will stick to the inner surface of the mold. Once the resin material begins to melt it will also stick to the inner surface of the mold over the alloy material. Thus, when the mold is cooled, the alloy material will form the surface layer of the part, with the polyethylene portion of the composite acting as an alloy to bond the surface layer to the substrate formed by the resin material.

As discussed above, the substrate in one embodiment can consist of "sandwich" type structure with solid skins and a foamed polyethylene core. In this embodiment, the solid skins can also constructed from a polyethylene material. To achieve the "sandwich" structure, in either method of the invention, the polyethylene material which makes up the solid skins will be sized smaller then the polyethylene material comprising the foamed core. As such, the polyethylene skin material will melt quicker then the core material causing it to travel outward from the foam material inside the mold. The polyethylene material which comprises the substrate's core can be provided with a blowing agent to create a foam substrate.

The mold can also be preheated prior to loading the resin and alloy. The preheating of the mold, may cause the smaller alloy material to begin to melt, prior to the mold being fully heated during the heating and rotating steps. The mold is also allowed to cool as described above, and thus, the mold can continue to be rotated during cooling to allow the part inside the mold to maintain an even wall thickness. Once cooled the mold is opened and the part is removed.

Figure 3:
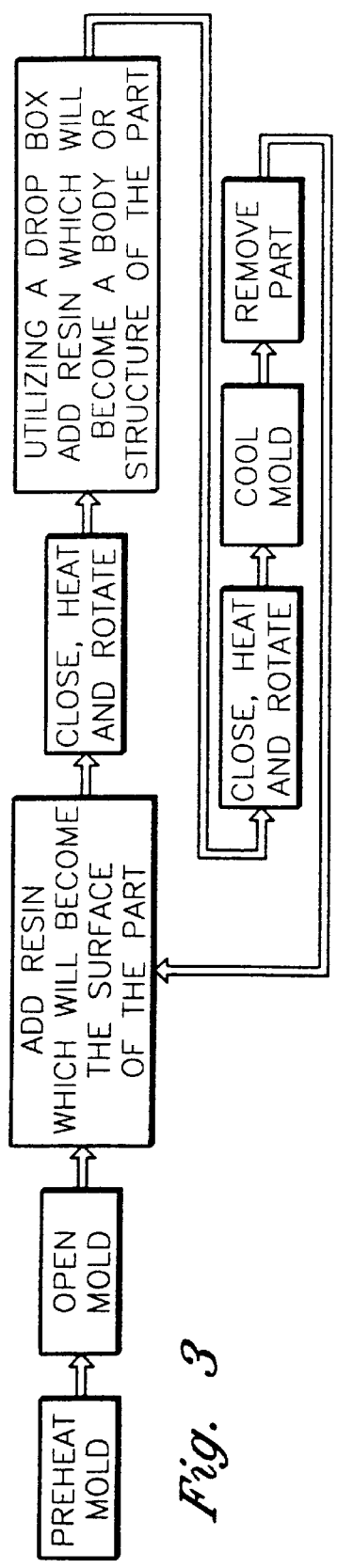
FIG. 3 is a block diagram of a third method for the rotational molding process of the present invention.

FIG. 3 illustrates the third method for the rotational molding process of the present invention. In this method, a mold, similar to the mold described above is provided. Initially, the mold is opened and a first resin which is to become the outer surface of the part is added. In the preferred embodiment the first resin consist of any acrylic polyethylene alloy, though such is not limiting. The resin is also preferably provided in powder form.

Once the first resin is added the mold is closed, heated and rotated. The mold is heated to a temperature which causes the first resin to melt. By rotating, the melted first resin evenly sticks to the entire inner surface of the mold and ultimately will become the outer surface of the molded part.

Once the first resin is sufficiently melted, a box, commonly referred to as a "drop box", is opened within the mold to introduce a second resin into the mold. The second resin will become the body or structure of the molded part. In the preferred embodiment the resin consist of a polyethylene material, though other materials can be used and are considered within the scope of the invention. With the use of a drop box, the need to grind the resins as described in the second method is eliminated, as the resins are introduced at separate times.

After the second resin is introduced by the drop box, the mold is again heated and rotated as described above. As heating begins, the second resin material begins to melt and sticks to the inner surface of the mold over the first resin. Thus, when the mold is cooled, the first resin will form the surface layer of the part. In the preferred embodiment, the polyethylene portion of the first resin composite acts as an alloy to bond the surface layer to the substrate formed by the second resin material.

As discussed above, the substrate in one embodiment can consist of "sandwich" type structure with solid skins and a foamed polyethylene core. In this embodiment, the solid skins can also constructed from a polyethylene material. The polyethylene material which comprises the substrate's core can be provided with a blowing agent to create a foam substrate.

In the third method, the mold can also be preheated prior to loading the first resin. The preheating of the mold, may cause the first resin to begin to melt, prior to the mold being fully heated during the heating and rotating steps. The mold is also allowed to cool as described above, and thus, the mold can continue to be rotated during cooling to allow the part inside the mold to maintain an even wall thickness. Once cooled the mold is opened and the part is removed.

Figure 4:
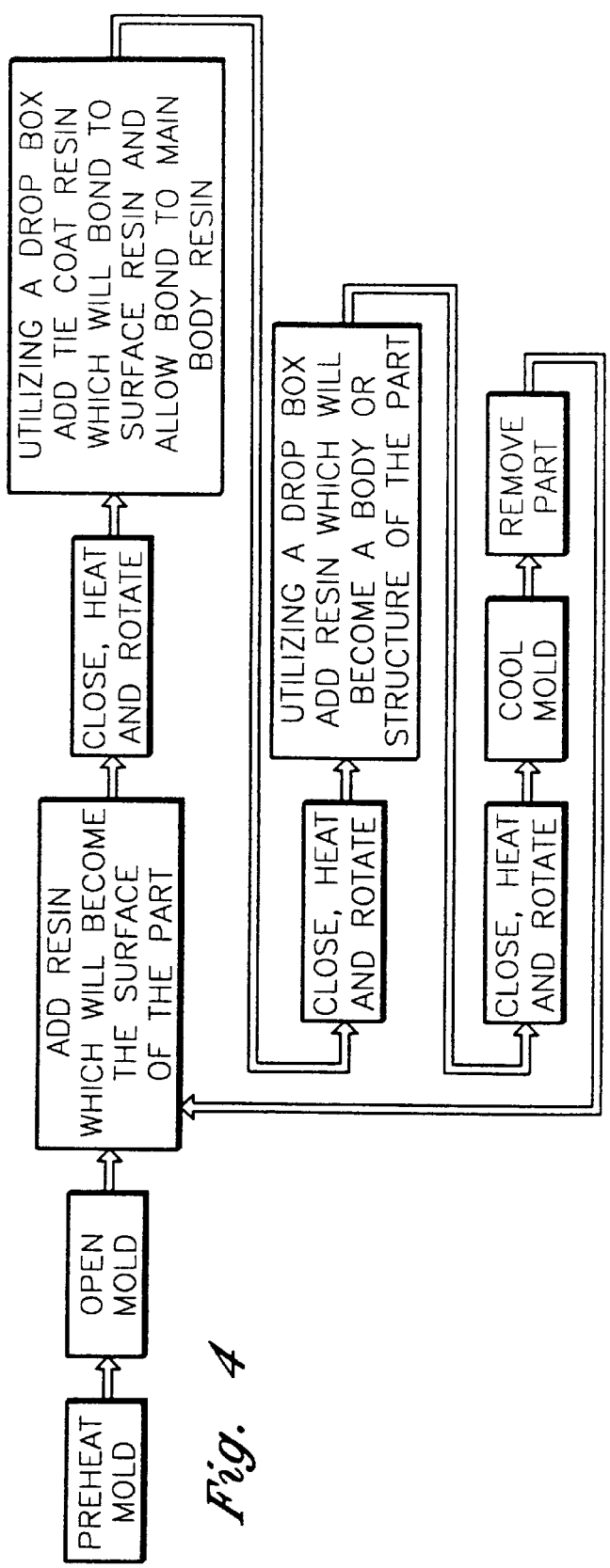
FIG. 4 is a block diagram of a fourth method for the rotational molding process of the present invention.

FIG. 4 illustrates the fourth method for the rotational molding process of the present invention. In this method, a mold, similar to the mold described above is provided. Initially, the mold is opened and a first resin which is to become the outer surface of the part is added. In this embodiment, the first resin is not an alloy but rather consist of a separate material such as acrylic, polycarbonate, styrenic or other hardened plastic which will create a hardened outer shell. The resin is also preferably provided in powder form.

Once the first resin is added the mold is closed, heated and rotated. The mold is heated to a temperature which causes the first resin to melt. By rotating, the melted first resin evenly sticks to the entire inner surface of the mold and ultimately will become the outer surface of the molded part.

Once the first resin is sufficiently melted, a first drop box is opened within the mold to introduce a second resin which acts as a tie coat or bond layer, preferably consisting of a modified polyethylene or alloy material, though other materials can be used and are considered within the scope of the invention. The tie coat bonds to the first resin. After the second tie coat resin is released into the mold, the mold is heated and rotated to evenly bond to the first resin which is provided over the inner surface of the mold.

Once the tie coat is properly melted, a second drop box is opened within the mold and a third resin is released. The third resin will become the body or structure of the molded part. In the preferred embodiment the resin consist of a polyethylene material, though other materials can be used and are considered within the scope of the invention.

After the third resin is released into the mold, the mold is once again heated and rotated, allowing the third resin to become melted and evenly distributed over the inside of the mold. This third resin bonds to the tie coat layer. The previously released tie coat acts as a bridge or intermediary allowing the main body resin to bond to the first layer, thereby bonding two materials which might not normally bond. Thus, when the mold is cooled, the first resin will form the surface layer of the part, the second layer the tie coat and the third layer the main body or substrate of the part.

As discussed above, the substrate in one embodiment can consist of "sandwich" type structure with solid skins and a foamed polyethylene core. In this embodiment, the solid skins can also constructed from a polyethylene material. The polyethylene material which comprises the substrate's core can be provided with a blowing agent to create a foam substrate.

In the fourth method, the mold can also be preheated prior to loading the first resin. The preheating of the mold, may cause the first resin to begin to melt, prior to the mold being fully heated during the heating and rotating steps. The mold is also allowed to cool as described above, and thus, the mold can continue to be rotated during cooling to allow the part inside the mold to maintain an even wall thickness. Once cooled the mold is opened and the part is removed.

In all of the above-described methods, the molded part can be provided with a harder, shinier and stronger surface layer as compared to parts molded by conventional rotational molding techniques. The surface layer is also relatively thin as compared to the remaining portion of the molded part. Alternatively, the outer surface layer can be the softer layer, with the substrate acting as the harder layer. Thus, the present invention allows for an outer surface layer having different characteristics and properties than those of the inner surface layer. The above-described methods also provide for a relatively stronger bond between the materials, as compared to traditional lamination The invention is described above where a polyethylene material is used for the resin which the part is molded from. Thus, a polyethylene material is included in the composite to act, amongst other things, as an alloy with the polyethylene resin. However, as stated above, the present invention should not be considered limited to polyethylene materials. Accordingly, it is within the scope of the invention to use other materials for the resin. In such event, it is preferred that a similar material, as the material selected for the resin, be selected as at least a part of the alloy material which forms the surface layer of the molded part.

Furthermore, the alloy material is not limited to being only the material used for the surface layer. It is within the scope of the invention to use a alloy material, such as the acrylic polyethylene combination, as the resin for the mold. In such cases, it is not necessary to provide a alloy material prior to adding the resin.

The above described methods can be utilized with various conventional molds. The heating, rotating and cooling steps of the methods are performed utilizing conventional devices, i.e. ovens, molds, etc.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for rotationally molding an article in a mold having inner surface corresponding to the shape of the article comprising:

adding a first resin material and a second resin material to the mold, wherein the first resin material has a first average particle size and the second resin material has a second average particle size, wherein the second average particle size is greater than the first particle size;

separating the first resin material and the second resin material within the mold;

heating the mold to a predetermined temperature;

rotating the mold;

melting the first resin material;

depositing the first resin material on the inner surface of the mold, wherein the rotation of the mold evenly distributes the melted first resin material on the inner surface of the mold to form a first layer;

melting the second resin material;

depositing the second resin material on the first resin material within the mold, wherein the rotation of the mold evenly distributes the melted second resin material on the first resin material within the mold to form a second layer on the first layer;

cooling the mold; and removing the article from the mold.

2. The method according to claim 1, wherein said heating the mold to a predetermined temperature includes preheating the mold prior to adding the first and second resin materials.

3. The method according to claim 1, further comprising rotating the mold while cooling the mold to maintain an even wall thickness of the article.

4. The method according to claim 1, wherein said separating the first resin material and the second resin material within the mold is performed using gravity.

5. The method according to claim 4, wherein said separating the first resin material and the second resin material within the mold includes melting the first resin material before the second material.

6. The method according to claim 1, wherein said separating the first resin material and the second resin material within the mold includes melting the first resin material before the second material.

7. The method according to claim 1, wherein the first resin material is an acrylic polyethylene alloy.

8. The method according to claim 1, wherein adding the first resin material and the second resin material to the mold, includes adding a mixture of the first resin material and the second resin material.

9. A method for rotationally molding an article in a mold having inner surface corresponding to the shape of the article comprising:

applying a first resin powder to the inner surface of the mold to form a hardened outer surface of the article;

adding a second resin material to the mold;

heating the mold to a predetermined temperature;

rotating the mold;

melting the second resin material;

depositing and bonding the second resin material on the first resin powder within the mold, wherein the rotation of the mold evenly distributes the melted second resin material on the first resin powder within the mold to form an intermediate bonding foamed core on the outer surface of the article;

adding a third resin material to the mold;

heating the mold to a predetermined temperature;

melting the third resin material;

depositing and bonding the third resin material on the foamed core within the mold, wherein the rotation of the mold evenly distributes the melted third resin material on the intermediate bonding foamed core within the mold to form a body of the article, whereby the foamed core is sandwiched between the hardened outer surface and the third resin material;

cooling the mold; and removing the article from the mold.

10. The method according to claim 9, further comprising preheating the mold to a predetermined temperature applying the first resin material.

11. The method according to claim 9, further comprising rotating the mold while cooling the mold to maintain an even wall thickness of the article.

12. The method according to claim 9, wherein applying the first resin material is accomplished by spraying the resin material on the inner srurface.

13. The method according to claim 9, wherein applying the first resin material comprises:

adding the first resin material to the mold;

heating the mold to a predetermined temperature;

rotating the mold;

melting the first resin material;

depositing the first resin material on the inner surface of the mold, wherein the rotation of the mold evenly distributes the melted first resin material on the inner surface of the mold.

14. The method according to claim 9, wherein adding the second resin material to the mold includes releasing the second resin material into the mold through a drop box.

15. The method according to claim 9, wherein adding the third resin material to the mold includes releasing the third resin material into the mold through a drop box.

* * * * *